United States Patent

[11] 3,542,336

[72] Inventor Elroy J. Giese
 Cleveland, Ohio
[21] Appl. No. 736,523
[22] Filed May 22, 1968
 Continuation-in-part of Ser. No. 645,260,
 June 12, 1967, abandoned.
[45] Patented Nov. 24, 1970
[73] Assignee Tomlinson Industries Inc.
 Cleveland, Ohio
 a corporation of Ohio

[54] PLUG FAUCET
 11 Claims, 8 Drawing Figs.
[52] U.S. Cl. ..................................................... 251/181,
 251/309, 251/310, 251/317
[51] Int. Cl. ....................................................... F16k 25/00
[50] Field of Search ............................................ 251/181,
 309, 310, 314, 315, 316, 317

[56] References Cited
UNITED STATES PATENTS

| | | | |
|---|---|---|---|
| 2,547,831 | 4/1951 | Mueller | 251/309 |
| 2,832,562 | 4/1958 | Myers | 251/310X |
| 3,004,550 | 10/1961 | Poisker | 251/317X |
| 3,111,299 | 11/1963 | Miller | 251/316X |
| 3,174,212 | 3/1965 | Seltsam | 251/309X |
| 3,288,432 | 11/1966 | Ferrin | 251/310 |
| 3,333,812 | 8/1967 | Mueller | 251/309X |
| 3,434,691 | 3/1969 | Hamilton | 251/309X |

Primary Examiner—Clarence R. Gordon
Attorney—Fay, Sharpe and Mulholland

ABSTRACT: A faucet having a body with a tapered central bore adapted to receive a tapered plug. An elastomer sealing ring surrounds an oval port in the body. The plug is spring biased into the bore of the body permitting limited longitudinal movement of the plug relative to the body so as to provide relief of such binding as may occur between the seal ring and the plug as the faucet is opened and closed.

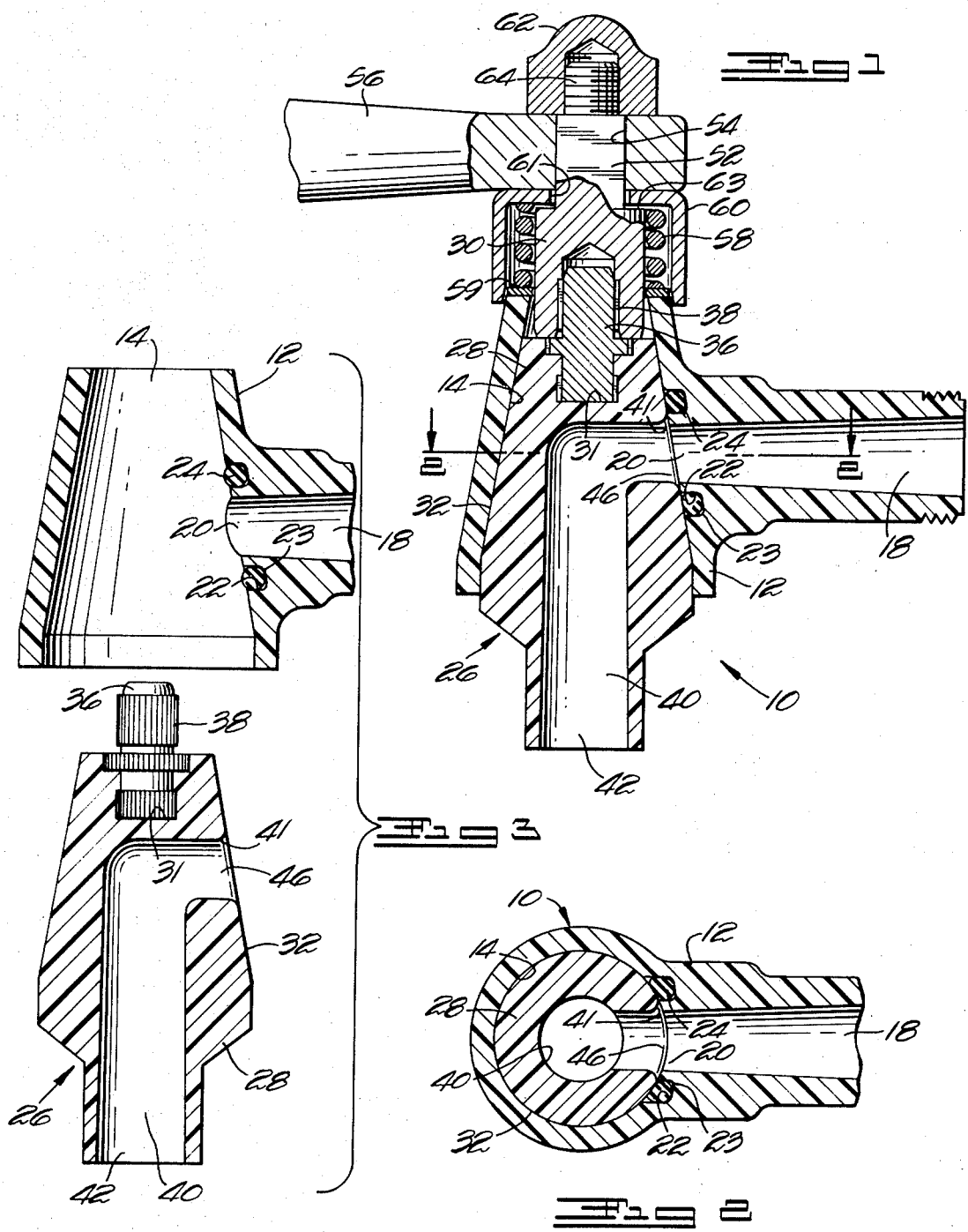

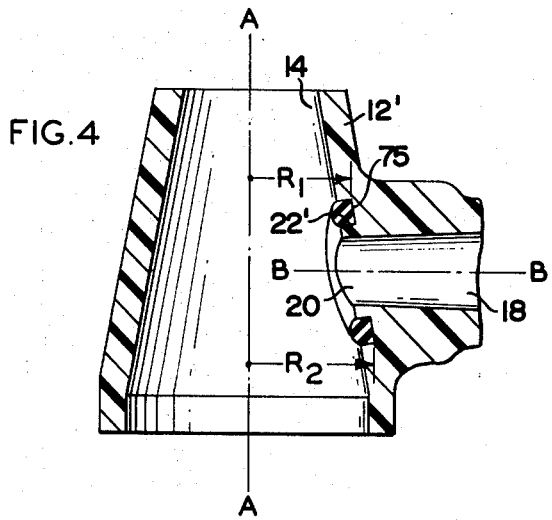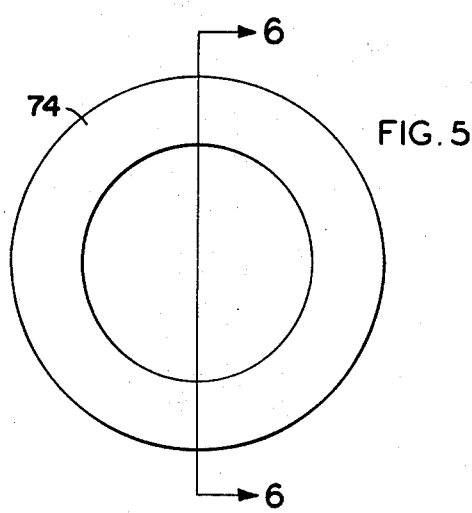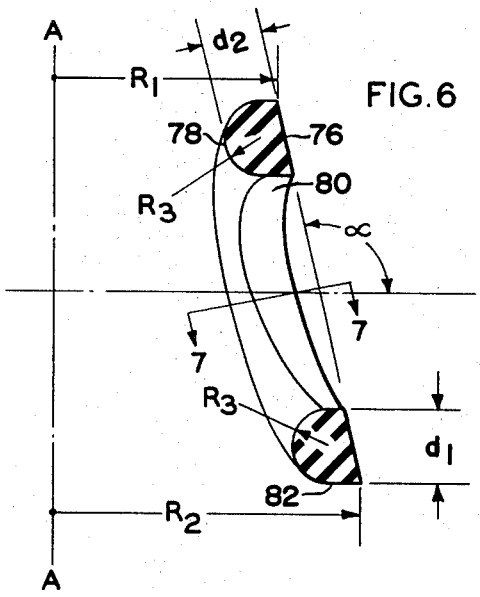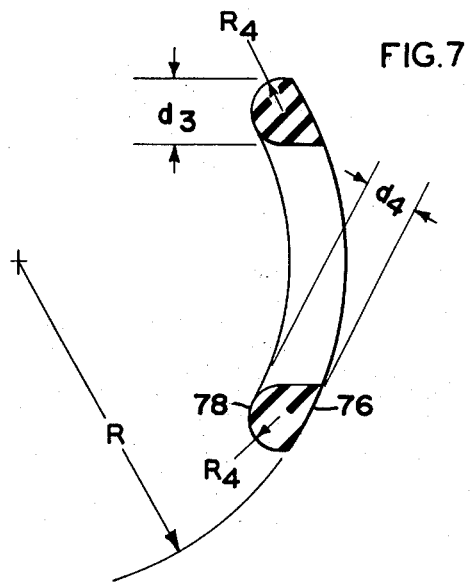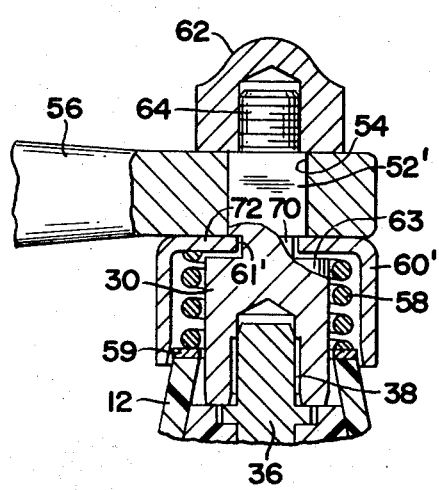

PLUG FAUCET

REFERENCE TO RELATED APPLICATION

This application is a continuation-in-part of application Ser. No. 654,260, filed June 12, 1967 and now abandoned.

BACKGROUND OF THE INVENTION

Plug valves or faucets have found a variety of uses in industrial fluid and gas systems as well as in the liquid food dispensing field. In the latter field, plug faucets constructed of metal have been particularly adapted for use in dispensing coffee, tea and the like. Such faucets often utilize a ported metal body having a tapered central bore into which is received a tapered plug. Upon rotation of the plug relative to the body, these ports can be placed in register to permit flow through the faucet. Plug faucets are well suited for use with liquid foods because the finely machined, tightly fitting walls of the mating plug and body tend to eliminate entrapment of food in the faucet and thus reduce the risk of contamination.

Unfortunately, in certain applications within the liquid food dispensing industry and elsewhere, various difficulties have been encountered in connection with some plug faucets. As an example, liquids which do not have oily constituents do not lubricate the mating surfaces of the faucet. Thus, the body and plug of the faucet tend to score with use. These difficulties are particularly acute in those cases in which the faucets are used for dispensing fluid under pressure in excess of that imposed by gravity.

Dispensing fruit flavored "slush-type" drinks, for example, presents a particularly difficult set of parameters. These drinks prior to dispensing are, in some cases, housed in a refrigerated pressurized reservoir. Liquid flows from the reservoir through the dispensing faucet in an icy, viscous mass much like soft ice cream. In other cases, the reservoir is not pressurized, and the liquid is in a crystalline state prior to the time it passes through the faucet.

Plug faucets commonly used in the liquid food industry in the past relied solely on surface-to-surface contact between the lapped walls of the plug and body for sealing purposes. This arrangement was perfectly acceptable in gravity feed systems but is not well suited to dispensing of liquids under pressure. This is true because to seal under pressure, the plug must be more tightly held against the tapered bore of the body. This tends to produce scoring of the sealing surfaces and consequent leakage.

In the case of "slush-type" drinks, the problem is compounded since, unlike coffee, for example, such drinks have no oily constituents which would tend to lubricate the mating surfaces of the faucet, and thus reduce the propensity of the body and plug to score. Also many "slush-type" drinks have acid bases which tend to attack metallic surfaces.

Moreover, when the faucets are not in constant use, they tend to dry out and the closely interfitting surfaces of the plug and body sometimes stick to one another, making it quite difficult to open the faucet at a later time and further contributing to scoring of the sealing interface.

It is obvious that these problems arise in large part from attempts to use a surface-to-surface sealing arrangement under pressure feed conditions and with liquids which do not have lubricating qualities. Many proposals have been made to eliminate surface-to-surface sealing in favor of elastomer seal rings, but efforts to do so have been, for the most part, unsuccessful. Rings encircling the plug permit entrapment of liquid and produce unsanitary conditions. A ring encircling the body port either will not stay in its groove during relative rotation of the plug and body, or is damaged as the edge of the port in the plug moves across the ring.

SUMMARY OF THE INVENTION

This invention contemplates a faucet comprising a body having a tapered internal central bore therethrough open at both ends. Extending transversely through the body and into the central bore is an inlet passageway which is substantially round in a plane perpendicular to the axis of the passageway. The intersection of the inlet passageway with the tapered central bore forms an oval inlet port. The central bore is provided with a groove surrounding and generally complementary in shape to the inlet port of the faucet body, and which carries an annular elastomer sealing ring.

Received within the central bore of the faucet body is a plug tapered to mate with the bore and provided with a flow passage entering the intermediate section of the plug laterally. The passage turns in the region of the longitudinal axis of the plug and follows such axis to the exterior of the plug where it functions as the outlet of the faucet. The passage is round in cross section and forms, at its juncture with the tapered exterior of the plug, an oval port adapted to register with the inlet port of the body. In the preferred embodiment of the invention a generous radius is provided at the zone where this passage meets the tapered exterior of the plug, thus to present a minimum of resistance as the port in the plug moves across the seal ring in the body. In the large size faucets of this invention, however, it has been found that a generous radius is not required to overcome nibbling of the sealing ring. Therefore this invention should not be considered as limited to the provision of a radius on the plug.

Disposed in the groove surrounding the inlet port of the faucet body is an elastomer sealing ring.

In the preferred embodiment of the invention the sealing ring is preformed so that in its free state it will be complementary in shape to the groove. The respective surfaces of the sealing ring, therefore, are adapted to be complementary in shape to both the tapered configuration of the back wall defining the groove in a vertical plane as well as the concave configuration of the back wall defining the groove in a horizontal plane. The sealing ring of the preferred embodiment, thus, is freely received within the groove surrounding the inlet port of the faucet body in an unstressed condition so as to substantially fill the groove while providing sealing with respect to the faucet plug.

In a modification of the sealing ring of the invention a planar or unpreformed type seal may be used.

Opposite the outlet end of the plug is a stem which extends beyond the faucet body and which is adapted to coact with suitable faucet actuating means, such as a handle. The biasing spring is received over the stem and urges the plug resiliently into the central bore of the body, causing the plug to be carried in the body in a floating fashion. This permits limited longitudinal movement of the plug relative to the body in the event that pressure increases in the faucet or the seal ring begins to bind against the plug. In effect, the resistance produced by such binding cams the plug slightly away from the central bore of the body to relieve a considerable portion of the stresses which would otherwise be imposed upon the seal ring. The result is a reduction in wear or damage to the seal during operation of the faucet and virtual elimination of the tendency of the plug, as it rotates, to roll the seal ring out of its groove. Further, a pressure relief is provided in the faucet in the event of pressure buildup in the liquid reservoir.

By successfully adapting the use of an elastomer seal to plug faucets, it is possible to achieve a number of positive advantages. Not the least of these is reduction in manufacturing cost. Since wide area sealing is no longer relied upon to prevent leakage, the necessity for carefully controlled, finely machined seating surfaces is eliminated. Mating parts can, therefore, be manufactured to much broader tolerances and from a wider variety of materials (such as plastics) with a consequent saving in cost.

The so-called "breakaway" problem occasioned by the plug and body components sticking together after periods of nonuse is no longer a factor since the surfaces of the plug and body need not be held together tightly enough to maintain a seal, and since the area over which the seal is made is reduced. Scoring problems are, therefore, either eliminated completely or reduced to within tolerable limits.

Another advantage of the faucet of this invention is the safety valve feature afforded by the spring biased plug. By controlling the tension of the spring biasing means, the plug can be moved longitudinally in the bore of the body by a predetermined pressure thus to relieve excess pressure in the system.

In the drawings:

FIG. 1 is a longitudinal sectional view of a faucet incorporating the principles of the invention and showing the modified form of the elastomer seal disposed in the groove of the faucet body;

FIG. 2 is a cross-sectional view taken along line 2-2 of FIG. 1;

FIG. 3 is an exploded view, in longitudinal section, of the faucet body and plug component;

FIG. 4 is a sectional view of the faucet body similar to that shown in FIG. 3 and showing the preferred form of the sealing ring as disposed within the groove of the faucet body;

FIG. 5 is an elevational view of the preferred form of the sealing ring of the invention;

FIG. 6 is a cross-sectional view taken along of the line 6-6 of FIG. 5;

FIG. 7 is a cross-sectional view taken along the line 7-7 of FIG. 6; and

FIG. 8 is a partial sectional view of the faucet of the invention and showing a modification of the spring cover 60.

Referring now more specifically to the drawings, there is shown a plug faucet indicated generally at 10, including a body 12 provided with an internal, longitudinally extending, tapered central bore 14. Bore 14 is open at both ends and extends completely through body 12. An inlet passageway 18 extends transversely through body 12, communicating at its inner end with the intermediate portion of central bore 14 and its outer end being adapted for attachment to a liquid supply source. The inlet passageway 18 is essentially round in a plane perpendicular to its longitudinal axis, thus forming at its juncture with the tapered central bore 14 an oval inlet port 20. In other embodiments of the invention the passage could define other shapes in a plane perpendicular to its axis.

Formed in the central bore 14 and surrounding inlet port 20 is a groove 22 generally complementary in shape to port 20 and into which is inserted an annular elastomer sealing ring 24. In the embodiment of FIG. 1 sealing ring 24 is an O-ring type seal biased into groove 22 so as to assume the configuration of groove 22. The bottom corners of groove 22 are slightly radiused at 23 to eliminate cavities in which liquid may become entrapped and thus contaminate the faucet. In other embodiments of the invention the entire bottom wall of the groove could be defined on a radius such that the groove is semicircular in section.

Sealing ring 24 as illustrated in FIG. 1 may take many forms other than the O-ring type seal shown. The preferred embodiment of the invention including a preformed seal will be described hereafter. Also within the scope of this invention should be considered a "quad" ring type seal.

Received in central bore 14 is a plug assembly 26. In the illustrated form, this assembly is comprised of a plug component 28, a nipple 36 and a stem component 30 extending axially outwardly beyond body 12 when the faucet is assembled. One end of nipple 36 is embedded in the smaller diameter end of plug component 28 and extends outwardly coaxially therefrom. The other end of the nipple is provided with longitudinally extending serrations or the like 38. Stem component 30 has an external diameter adjacent plug component 28 slightly less than the smaller diameter terminus of surface 32, and is provided at one end with a blind, longitudinally extending bore 31 into which the serrated end 38 of nipple 36 is pressed to lock the components 28 and 30 together against relative axial or rotational movement.

Depending upon the type of application for which the faucet is intended, the material from which its parts are to be made, and various other considerations, it is possible to produce the plug component 28 and the stem component 30 as a single, unitary part. Where possible, this is desirable for simplicity and economy.

Plug assembly 26 is provided over an intermediate portion of its length with an external tapered surface 32 which mates with the tapered central bore 14 in faucet body 12. A flow passage 40 extends through plug assembly 26, entering laterally an intermediate portion of tapered surface 32, and subsequently turning along the longitudinal axis of the plug eventually to form an outlet 42.

The portion of flow passage 40 which lies along the longitudinal axis of the plug may in some cases be formed on a slight taper which converges away from outlet 42. In certain applications, this improves the ease with which liquid drains from the passage when flow is terminated. The flow passage 40 is essentially round in perpendicular section, and thus at its juncture with tapered surface 32 forms an oval port 46 about the same in size and configuration as inlet port 20 in faucet body 12. The port 46 of the flow passage 40 joins the external surface 32 of the plug approximately on the level of the inlet port 20 of the faucet body 12 so that upon proper rotational orientation of the plug relative to the body, port 46 will be alined with the inlet port 20 to allow fluid to pass completely through the faucet. In the zone of its juncture with the tapered surface 32, flow passage 40 may be radiused as at 41. This arrangement prevents an unacceptable level of abrasive forces being transferred to seal ring 24 by the edges of port 46 as it passes over the ring on opening and closing of the faucet particularly in the smaller size faucet. Sharp port edges may either pull the ring out of its groove or tear, cut and abrade the ring until it fails prematurely in smaller faucets. In larger faucets the requirement for a generous radius at 41 is not critical.

Provided intermediate the ends of the stem 30 is a length 52 polygonal in cross section and nonrotatably received within a cooperating aperture 54 provided in the handle 56. In this manner, rotational movements of the handle about the longitudinal axis of the faucet may be imparted to the valve plug assembly.

A compression spring 58 carefully selected to exert the proper degree of biasing force is telescoped over stem 30 so that one end thereof rests upon the upper face of shim washer 59, which in turn engages the the upper end of the faucet body 12. In alternate embodiments the spring 58 may rest directly on body 12 without the necessity of providing the shim washer 59. A cup-shaped spring cover 60 is provided with a bottom aperture 61 of a size and shape such that the cover may be received in inverted fashion over the polygonally shaped length 52 of stem 30, with the bottom edge of the cover 60 encasing the upper margin of the faucet body. In the embodiment of FIG. 1 the aperture 61 of spring cover 60 is generally circular in shape having a diameter slightly exceeding the greatest width of the polygonally shaped length 52. A nut 62, or other suitable retaining means is removably engaged with threads 64 provided upon the free end of stem 30 to compress the spring and thus hold the plug assembly and the handle in place. The maximum degree of spring compression is limited by engagement of the spring cover 60 with shoulder 63 on stem 30.

A modification of the polygonally shaped length 52 of stem 30 and spring cover 60 is shown in FIG. 8. Where possible similar reference characters will be used in FIG. 8 as were used in the description of FIG. 1. Where elements differ slightly a prime superscript will be used. Thus as shown in FIG. 8 a compression spring 58 is telescoped over stem 30 so that one end thereof rests upon the upper face of shim washer 59, which in turn engages the upper end of the faucet body 12. Alternately, spring 58 could directly engage body 12. Stem 30 is nonrotatably secured to body 12 as by engaging nipple 36 provided with longitudinally extending serrations or the like 38. A cup-shaped spring cover 60' is provided with a polygonally shaped aperture 61' complementary to the cross sectional shape of length 52' of stem 30. An annular groove 70 is defined in the external surface of length 52 adjacent shoulder 63. Since the walls defining aperture 61' of FIG. 8 and the external surface of length 52 are complementary in shape, spring cover 60' may be received in inverted fashion over length 52' until flange 72 is opposite groove 70. A slight rotation of spring cover 60 with respect to length 52' will cause spring cover 60' to be locked within groove 70 as aperture 61' will be oriented in a noncomplementary relationship with respect to length 52'. In the embodiment of FIG. 8 a fixed amount of compression may be applied to spring 58 by spring cup 60' locked in groove 70 irrespective of the degree to which nut 62 is threadedly advanced over threads 64. The principal advantage of the structure of FIG. 8 is that handle 56 may be readily removed from the faucet stem as by removing the nut 62 without disassembly of the spring and spring cover. Spring 58 will otherwise be retained in place by spring cover 60' trapped within groove 70 of length 52'. Replacement of the handle 56 of FIG. 8 therefore, does not require a recompression of spring 58 and a reassembly of the entire upper end of the faucet should it be desired to change handle 56.

It will be evident that the faucet of this invention could be modified still further providing for the direct engagement of spring 58 and handle 56 and the elimination of cover 60.

A brief description of the spring 58 with respect to the safety valve feature of the faucet will now be made. Spring 58 functions both to bias plug 28 into sealing engagement with the sealing ring 24 and also to permit a controlled "breakaway" of the plug with respect to the body in the event of high pressure in the system or binding of the plug and body during rotation. The spring tension, thus, must be selected so as to provide sufficient sealing bias as well as the desired degree of "breakaway" or safety relief required by the user.

In assembling faucet 10, the plug component 28 is inserted into and seated within the central bore 14 of faucet body 12. Prior to placement of the spring loading mechanism on the upper end of plug component 28, plug port 46 and body port 20 will not be in perfect register. Rather, plug port 46 will be slightly offset relative to body port 20 owing to the fact that the seal ring 24, in the absence of compressive force, will not be fully seated within groove 22. Placement, however, of the spring loading mechanism will pull the plug assembly 26 into intimate relation with the central bore 14, compressing the seal ring 24 and placing ports 46 and 20 in alinement with one another. The faucet is then ready for use. It should be noted that the entire assembly has been accomplished without the use of tools or special instruments.

The fact that the bore 14 in which the seal ring is located is tapered presents an advantage in terms of permitting easy removal of the ring either for cleaning or replacement. This is true because access to the ring may be more readily had than if the bore 14 were cylindrical.

Moreover, the use of sealing ring 24 surrounding port 20 also reduces scoring and "breakaway" problems when slush-type substances or substances without oily constituents are dispensed through the faucet. Further, since groove 22 closely encircles port 20, only a small zone of the interface between plug assembly 26 and central bore 14 is exposed to the liquid being dispensed. This, of course, reduces the risk of contamination arising from entrapment of liquid between the interface. In addition, as plug port 46 is rotated in and out of register with body port 20, the sealing ring 24 serves to wipe the plug component surface 32 free of any liquid which may have contacted it, again enhancing the ability of the faucet to remain in a sanitary condition over extended periods of use.

Of substantial importance to proper operation of the faucet is the use of a spring loading mechanism by which to bias resiliently the plug assembly 26 into seating engagement with tapered central bore 14. Perhaps the greatest problem encountered with faucets of the present type is the tendency for rotation of the plug to pinch, tear and abrade the seal, or to roll the seal out of its groove as the plug port moves back and forth over the seal during opening and closing of the faucet. By rounding the edges of the plug port and by resiliently biasing the plug, it is possible virtually to eliminate this problem. Should the edge of port 46 begin to pinch seal ring 24, forces build up which cam the plug assembly 26 axially away from central bore 14, thus relieving, to an extent, the compression on the seal and reducing the stresses under which the seal is placed. If the plug were not capable of axial displacement relative to the body, such stresses would not be relieved and the ring would be damaged or totally destroyed.

Attention will now be directed to FIGS. 4—7 wherein the preferred form of the sealing ring will now be described. Where possible similar reference characters will be used in the description of FIG. 4 as were used in the description of FIG. 3. Where elements are similar but not identical the prime superscript will be used with the reference character. In FIG. 4, there is shown a faucet body 12' provided with an internal longitudinally extending, tapered central bore 14 having an axis A-A. Bore 14 is open at both ends and extends completely through body 12'. An inlet passage 18 extends transversely through body 12' about axis B–B. Inlet passage 18 is essentially round in a plane perpendicular to its longitudinal axis, thus forming at its juncture with the tapered central bore 14 an oval inlet port 20.

Formed in the wall defining the central bore 14 and surrounding the inlet port 20 is a groove 22' into which is inserted an annular elastomer sealing ring 74.

Before describing the sealing ring 74 in detail a brief reference will be made to the groove 22'. Since groove 22' is defined in the tapered wall defining bore 14, the back wall 75 of groove 22' will define a curved surface generally complementary to the surface of the wall defining bore 14. Thus, in the vertical sectional view of FIG. 4 the back wall 75 of groove 22' will be disposed at a predetermined angle alpha with respect to the axis B–B of inlet passage 18.

In addition to having a back wall surface that is generally complementary to the surface of the wall defining bore 14 in the vertical plane, the groove 22' is also concave so as to be complementary to the wall defining bore 14 in a horizontal plane. Since the wall defining bore 14 is tapered in a vertical plane, the radius of curvature of groove 22' will vary in the horizontal plane depending upon the relative position of the groove with respect to the axis A-A (FIG. 4).

Groove 22' may therefore be described as generally annular in shape and having a back wall generally complementary to the wall defining the bore in which the groove is disposed. Groove 22', therefore, has various radii of curvature in a horizontal plane extending from a relatively small radius $R_1$ (FIG. 4) to a relatively large radius $R_2$ (FIG. 4). This groove configuration renders sealing of the plug assembly difficult since planar sealing rings must be stressed or biased in order to conform to the groove 22'. It is a natural consequence of a biasing of a planar sealing ring that the sealing ring will seek its relaxed or free state condition thus tending to become dislodged from the groove.

In the preferred embodiment of this invention the sealing ring is preformed so that while in the free or unbiased state it will be generally complementary in shape to the groove in which it is received.

In FIG. 5, a front elevational view of the preformed sealing ring of the preferred embodiment of this invention is shown. FIG. 5 should not be construed as a true view of the sealing ring, but rather an elevational view of the sealing ring taken along the line A–A of FIG. 4. In FIG. 6, a cross-sectional view of the sealing ring 74 is shown including a back face 76, a front face 78, an inner side face 80, and an outer side face 82. The view of FIG. 6 is generally complementary to the view of FIG. 4 in that the sealing ring of FIG. 6 is disposed in the orientation necessary to insert the sealing ring in the groove 22' of FIG. 4. Back face 76 of sealing ring 74 is formed so as to be generally complementary to the back wall 75 of groove 22'. Thus as is shown in FIG. 7 back face 76 is defined on a radius of curvature R that is complementary to a similar radius of curvature of the back wall 75 in any particular horizontal plane. As has been previously pointed out, the radius of curvature R of FIG. 7 is not constant but will vary depending upon the point along the axis A–A of FIG. 4 that a particular radius is drawn. Thus, as will be evident from FIG. 6 the radius may vary from a relatively small value $R_1$ at the uppermost portion of the sealing ring to a relatively large value $R_2$ at the bottommost portion of the sealing ring. Values $R_1$ and $R_2$ of FIG. 6 should be generally considered equal to the values of $R_1$ and $R_2$ of FIG. 4.

As will be evident from FIG. 6, back face 76 of sealing ring 74 will define a pair of lines in the plane defined by the intersecting axes A-A and B-B. As shown in FIG. 6 back face 76 thus defines an angle alpha with respect to the axis B-B which is generally equal to the angle alpha of FIG. 4 defined by the back wall 75 of groove 22'.

In its unbiased or natural state, therefore, sealing ring 74 of FIG. 6 is generally complementary in shape to the groove in which it is to be received. Furthermore, the cross section of the sealing ring is generally complementary to the cross section of the groove 22' so as to eliminate cavities in which liquid passing through the faucet might otherwise be entrapped. Thus, as is shown in FIG. 6, the inner side face 80 and the outer side face 82 are parallel in the vertical plane and each respectively defines a relatively sharp corner with respect to the back face 76. The front face 78 is drawn on a radius $R_3$ (FIG. 6) so as to define a sealing surface.

In the sectional view of FIG. 7 the front face 78 of sealing ring 74 is drawn on a radius $R_4$. In the preferred form of the sealing ring $R_3$ (FIG. 6) slightly exceeds $R_4$ (FIG. 7) and the transition surfaces defined by the inner side face 80 and the outer side face 82 are smooth and gradual with no defects that could cause fluid leakage.

The thickness of the sealing ring of the preferred form similarly varies in the vertical and the horizontal planes. Thus, in the vertical plane of FIG. 6, the thickness $d_1$ as measured between the inner side face 80 and outer side face 82 slightly exceeds the thickness $d_3$ of FIG. 7 as measured in the horizontal plane between faces 80 and 82. Similarly, the thickness of the ring as measured between the back face 76 and the front face 78, $d_2$ of FIG. 6, slightly exceeds the thickness $d_4$, FIG. 7, as measured in the horizontal plane. It should be pointed out that while reference has been made to FIG. 7 in terms of a horizontal plane, the line 7-7 of FIG. 6 along which the view of FIG. 7 has been taken, is not truly horizontal since the sealing ring is normally disposed at an angle alpha (FIG. 6) with respect to the true horizontal. For purposes of description, however, FIG. 7 may be referred to as a horizontal sectional view.

As an example of representative relationships of the various surfaces of the sealing ring, the preferred form of the sealing ring having a true inside diameter of .415 inch will be defined by an angle alpha of approximately 102°. $R_1$ is .450 inch and $R_2$ is .575 inch. $R_3$ is .056 inch whereas $R_4$ is .052 inch. $d_1$ is .110 inch whereas $d_3$ is .102 inch. $d_2$ is .103 inch whereas $d_4$ is .093 inch. The relationships just described are typical for the views as shown and any measurement estimated outside of the views should be adjusted accordingly since a smooth transitional surface interconnects the elements.

With the preferred form of the sealing ring of FIG. 6 disposed within the groove 22' of FIG. 4, the placement of the spring loading mechanism of the faucet will pull the plug assembly 26 into intimate relation with the central bore 14, compressing the sealing ring 74 fully into the groove 22'. Since the seal 74 of FIG. 6 has been preformed, full seating of the sealing ring in the groove 22' will not unduly stress or bias the seal out of its free state condition. Thus, there are no forces within the seal acting to force the seal out of the groove in which it is received. The probability of rotation of the plug causing pinching, tearing, or abrading of the seal is thus reduced and a relatively long seal life results.

The degree of taper of the wall defining bore 14 may vary within the scope of this invention. In the preferred embodiment of FIG. 4 the angle alpha is defined as approximately 102°. The wall defining bore 14 thus defines a half-angle of 12° with the vertical axis A-A. Other degrees of taper may be considered within the scope of this invention. In its broadest form this invention may also be defined to include a nontapered bore 14 or a cylindrical bore in the faucet body into which is adapted to be received a substantially cylindrical plug assembly.

In the embodiment of FIG. 1 the taper of the wall defining bore 14 and the taper of plug 28 has been shown as converging toward handle 56. In an alternate embodiment the body and plug could be inverted such that the taper of the respective elements converges toward the discharge end of the plug.

For ease of description, the invention has been disclosed as being incorporated in a single preferred embodiment and a modification thereof. It is obvious, however, that various other modifications may be made without departing from the true spirit of the invention. It is, intended, therefore, to be bound only by the scope of the appended claims.

I claim:

1. A plug faucet comprising:
   a faucet body having an internal tapered central bore extending therethrough about a first axis, said bore having one end thereof opening to the exterior of said faucet body;
   a plug received within said central bore for rotation therein, the exterior surface of said plug having a portion thereof tapered to complement and mate with the wall defining said central bore, one end of said plug being positioned at the open end of said central bore;
   a transverse inlet passage extending through said faucet body about a second axis, said passage communicating, at one end thereof, with said central bore to form an inlet port, and at the other end thereof being adapted for connection to a liquid supply source;
   a flow passage extending through said plug, said flow passage entering the tapered exterior surface of said plug laterally and emerging from said one end of said plug along the longitudinal axis of said plug to form an outlet for the faucet;
   a port formed by the juncture of said flow passage with the exterior surface of said plug, the port in the plug and the inlet port in said body being so positioned along the longitudinal axis of the faucet as to be capable of register upon selective rotational orientation of said plug relative to said body;
   an annular groove provided in the wall defining said central bore surrounding the inlet port, and of a size to encircle the port in the plug when such port is in register with said inlet port in the body;
   an annular seal ring received within said groove and compressed between said body and said plug;
   means resiliently biasing said plug into said body, whereby said plug is capable of limited axial displacement relative to said body so as to relieve stresses which would otherwise be imposed on said seal ring; and
   means for imparting rotation to said plug relative to said body.

2. The plug faucet of claim 1 in which:
   said seal ring is preformed so as to define in the free state;
   a back face having a taper generally complementary to the taper of said central bore; and
   the radii of curvature of said seal ring along said first axis being generally complementary to the radii of curvature of the wall defining said central bore along said first axis.

3. A plug faucet as defined in claim 1 in which the means biasing said plug comprises a spring operatively engaging said plug and said body.

4. A plug faucet as defined in claim 3 and further including a spring cover and means to secure said spring cover to said plug.

5. A plug faucet as defined in claim 4 in which said securing means is further defined as an annular groove in said plug and a flange extending from said spring cover and received in said groove.

6. A plug faucet as defined in claim 1 in which the other end of said central bore opens to the exterior of said faucet body, and further in which the other end of said plug includes a stem extending through said central bore to the exterior of said faucet body, said stem being provided with means for operative engagement with said means for imparting rotation to said plug.

7. A plug faucet as defined in claim 6 in which a spring is received over said stem, said spring being in axial force transmitting relationship at one end with said faucet body, and at the other end with said plug.

8. The plug faucet of claim 1 in which the portion of the flow passage which lies along the longitudinal axis of said plug is formed on a taper converging away from said one end of said plug to facilitate draining of liquid from the faucet after closing.

9. The plug faucet of claim 1 in which said seal ring is further defined as an elastomer seal.

10. The plug faucet of claim 1 in which said juncture is generously radiused.

11. The plug faucet of claim 1 in which said seal ring is further defined as including:
- a back face;
- a front face;
- an inner side face;
- an outer side face; and
- said back face defining a pair of lines in the plane defined by said first and second axes, said lines defining an angle with respect to said second axis complementary to the angle of taper of said central bore, the radii of curvature of said back face along said first axis being complementary to the radii of curvature of the wall defining said central bore.